United States Patent [19]

Scodino et al.

[11] 4,363,569

[45] Dec. 14, 1982

[54] APPARATUS FOR SUPPORTING AND ERECTING SUPPORTING MEANS FOR SUPPORTING UNDERSEA PIPELINES AT ALL DEPTHS

[75] Inventors: Ambrogio Scodino, San Donato Milanese; Fernando Po, Milan, both of Italy

[73] Assignee: Saipem S.p.A., Milan, Italy

[21] Appl. No.: 141,188

[22] Filed: Apr. 17, 1980

[30] Foreign Application Priority Data

Sep. 17, 1979 [IT] Italy ............................... 25763 A/79

[51] Int. Cl.$^3$ .............................................. F16L 1/04
[52] U.S. Cl. .................................... 405/303; 405/158; 405/172
[58] Field of Search ............... 405/154, 157, 158, 172, 405/169, 222, 223, 303; 414/745, 747; 425/59

[56] References Cited

U.S. PATENT DOCUMENTS

| | | | |
|---|---|---|---|
| 3,793,845 | 2/1974 | Keith | 405/172 |
| 3,861,158 | 1/1975 | Swain et al. | 405/172 |
| 4,229,121 | 10/1980 | Brown | 405/158 |
| 4,268,190 | 5/1981 | Tesson | 405/169 |

FOREIGN PATENT DOCUMENTS

2369387 5/1978 France ................................ 405/172

*Primary Examiner*—David H. Corbin
*Attorney, Agent, or Firm*—Morgan, Finnegan, Pine, Foley & Lee

[57] ABSTRACT

Improved apparatus is provided for forming or erecting concrete loaded supporting means for supporting undersea pipelines at all depths and in the presence of undulating sea beds characterized by providing suspendable service module or frame means provided with pumpable concrete carrying means, vertical articulated positioning arm means mounted at one end to one end of the service module means with the one end thereof having means for releasably engaging concrete receiving pipe support module means, means for actuating the articulated positioning arm to place the support module beneath the undersea pipe to be supported, means operatively associated with the vertical articulated positioning arm and the concrete carrying means for transferring cement from the concrete carrying means to the support module.

8 Claims, 7 Drawing Figures

APPARATUS FOR SUPPORTING AND ERECTING SUPPORTING MEANS FOR SUPPORTING UNDERSEA PIPELINES AT ALL DEPTHS

This invention relates to an improved apparatus for supporting a pipe suspended over undulated sea beds, including at great depth, by a support module constituted by a high strength synthetic fibre fabric envelope which is filled with liquid cement when positioned below the pipe to be supported, and more specifically relates to an apparatus which by allowing a large support module to be used and to be positioned with extreme accuracy under the pipe to be supported whatever the configuration of the sea bed and whatever the position of the pipe to be supported relative to the apparatus, enables large diameter pipes to be supported simply, safely, rapidly, accurately and economically, even when they are suspended at great depth over depressions in the sea bed which comprise large differences in level, i.e. when the distance between the suspended pipe to be supported and the sea bed is great. Substantially, the apparatus according to the invention consists of a considerable improvement in the apparatus for supporting pipes suspended over undulated sea beds, including at great depth, as described in U.S. patent application Ser. No. 093,127 filed on Nov. 9, 1979, said known apparatus comprising a support module constituted by a high strength synthetic fibre fabric envelope of cushion configuration with a rectangular base and a saddle-shaped top, which has to be dragged empty, i.e. in a limp state, underneath the pipe to be supported by means of a submarine, and a recoverable service module constituted by a casing connected by a support cable to the depot ship and supporting a vessel or container full of liquid cement and means for conveying the liquid cement under pressure into said support module which is releasably connected to said container by a flexible conveying tube of optimum length for enabling the support module to be positioned by the submarine under the pipe to be supported.

Such a known apparatus has considerable limitations and operating drawbacks, all determined substantially by the fact that the support module is positioned under the pipe to be supported by dragging it along the sea bed using a submarine. In this respect, as the sea bed is never flat but is always rough, it is apparent that only a small support module can be dragged without danger of damaging it against the roughness of the sea bed, and in addition besides being very difficult, costly and time consuming, the dragging operation never allows precise positioning of the support module underneath the pipe to be supported.

The impossibility of precise positioning together with the fact that the support module is only dragged along the sea bed means that more than one support module cannot be stacked on each other, which would in fact have to be done in the case of large level differences, i.e. if the pipe to be supported is suspended at a considerable height above the sea bed or if it is a large diameter pipe, and thus because of its heavy weight requires a large support surface. Finally, effective utilisation of the known apparatus is limited, as is clearly stated in the above mentioned patent application, to the case in which the pipe to be supported is suspended over slight undulations on the sea bed, so that the distance between the suspended pipe to be supported and the sea bed is small, and provided the pipe is not of large diameter. On the other hand, because of the inevitable presence of underwater currents of greater or lesser strength, the support module or cushion of the known apparatus could fold back on itself while being dragged along the sea bed, so hampering the subsequent introduction of the liquid filling cement. To avoid this danger, which represents a further reason why large support modules cannot be used in the known apparatus, this dragging operation has to be carried out with extreme care, with consequent further time wastage. Finally, a further drawback of the known apparatus is due to the lack of a suitable arrangement for facilitating the outflow of the liquid cement from its container, and the fact that the interior of said container is not easily accessible for cleaning after each emptying operation, so that it is not possible to completely remove all the solid cement residues which form in the container and which can lead to blockages in the conduit which conveys the liquid cement to the cushion-shaped support module, so causing flow stoppage and consequent interruption of the entire filling operation for said support module under the suspended pipe to be supported.

The object of the present invention is to obviate the aforesaid drawbacks and limitations, by providing an apparatus for supporting a pipe suspended over undulated sea beds, including at great depth, which enables even a large support module or cushion to be positioned with extreme accuracy, rapidity and reliability below the suspended pipe, even if at a considerable distance from the apparatus and for any sea bed configuration or any position of the pipe relative to the apparatus, without the support module becoming folded and thus hindering its subsequent filling with liquid cement, and which allows effective cleaning of the interior of the liquid cement containers which by being provided with an effective arrangement for facilitating the outflow of the liquid cement are able to have a large liquid cement storage capacity such as to allow filling of large diameter support modules or cushions for supporting large diameter pipes even when suspended at a considerable height above the sea bed. This object is substantially attained in that the support module or cushion is no longer dragged along the sea bed by a submarine, but is carried accurately into position below the pipe to be supported by means of a vertical articulated positioning arm constituted by three beam or trellis elements hinged together one after the other by means of horizontal rotation pins and turned into vertical positions, and which can be extended forwards by mutual rotation about said horizontal rotation pins, and of which the most outer or third element of the articulated arm releasably supports said support module at its free end, whereas the most inner or first element of the articulated arm is hinged at its free end, by means of two horizontal rotation pins one of which is hollow to allow passages of the liquid cement, to two vertical plates rigid with a vertical rotation pin, which is also hollow to allow passage of the liquid cement, and which is supported rotatable through 360° in a vertical tube portion welded to the end of a bracket structure fixed to the recoverable service module which supports the cylindrical liquid cement containers and which rests on the sea bed by means of ball-jointed feet which adapt said recoverable service module to the inclination of the sea bed on which it is required to rest, said vertical articulated positioning arm being provided with an articulated conduit in the form of three successive jointed pipes which follows the configuration of said arm to which it is fixed, and which by connecting said hollow horizontal rotation pin of the first element of the arm to the support module, enables liquid cement to be transferred or conveyed into said support module, the liquid cement being conveyed by flexible conduits from the cylindrical containers into said hollow vertical rotation pin of the arm, which is connected by a conduit to said hollow horizontal rotation pin of the first element of the arm.

In this manner, as the vertical articulated positioning arm is permitted both a wide range and height adjustment by virtue of the mutual rotation of its elements about the horizontal rotation pins, and in addition can be rotated through 360° about a vertical axis, it is possible not only to rapidly, reliably and accurately position the support module below the pipe to be supported and to fill it with liquid cement, whatever the distance of the pipe from the apparatus and its position relative thereto, and whatever the configuration of the sea bed, but it is also possible to stack more than one support module on each other and thus support large diameter pipes even when these are suspended at a considerable height above the sea bed.

In addition, the support module or cushion, constituted by a high strength synthetic fibre fabric envelope comprising a rectangular base piece joined at its edges to another saddle-shaped piece forming the top, is provided on one side with a hose fitted with a non-return valve and a connector for connecting to an instant connection and release coupling by means of a projecting control lever, fitted to the free end of said articulated conduit for conveying the liquid cement, is now strengthened by means of a tubular perimetral reinforcement which encloses and supports said fabric envelope, so that it is possible to use a large support module without any danger of it undergoing harmful folding, and in addition said support module is releasably supported at the free end of said third element of said vertical articulated positioning arm by inserting one side of said tubular perimetral frame of the support module into a suitable substantially U-shaped support frame of C cross-section, which is rotatably supported at the free end of said third element of the articulated positioning arm by means of a pin rigid therewith which is inserted into a cavity at the free end of said third element of the articulated positioning arm, and is rotated by a hydropneumatic cylinder mounted orthogonally on the outside of said third element of the articulated positioning arm and connected to a lug on said pin, which projects from a slot in said third element of the articulated positioning arm, said tubular perimetral reinforcement being retained within said guide frame by a hook which is hinged to the free end of the third element of the articulated positioning arm, and is operated by a hydropneumatic cylinder. In this manner, not only can the support module be easily and rapidly released from its support, but it is also possible to rotate it so as to incline it to conform to any inclination of the sea bed on which it is required to rest.

Finally, the cylindrical liquid cement containers supported by the recoverable service module are closed at their ends facing said vertical articulated positioning arm, by cone frustum closure headpieces which are connected by said flexible conduits to said hollow vertical rotation pin of the articulated positioning arm, and are instantaneously clamped against the ends of said cylindrical containers by the action of hydropneumatically controlled cams, said cone frustum headpieces being all mounted on a single carriage which slides, under hydropneumatic control, on two rails supported by said recoverable service module. In this manner, while the cone frustum shape of the closure headpieces facilitates the conveying of the liquid cement from the cylindrical containers into the pipes, the facility for rapidly removing the closure headpieces by acting on said carriage gives easy access to the cylindrical containers for cleaning and removing deposits.

More specifically, the apparatus for supporting a pipe suspended over undulated sea beds, including at great depth, comprises a support module for positioning under the suspended pipe and to be filled with liquid cement, the support module, in the manner of a cushion, being constituted by a high strength synthetic fibre fabric envelope comprising a rectangular base piece joined at its edges to another piece in the form of a saddle acting as the top, and provided on one side with a hose fitted with a non-return valve and a connector for connecting to an instant connection and release coupling by means of a projecting control lever, the coupling being provided at its free end with a conduit for conveying the liquid cement contained in cylindrical containers supported by a recoverable service module which, laid on the sea bed by a depot ship by means of a support cable, also supports the means for pressure-injecting the liquid cement into said support module, wherein said support module is strengthened by a tubular perimetral reinforcement which encloses and supports said fabric envelope and is releasably supported at the free end of the most outer or third element of a vertical articulated positioning arm constituted by three beam or trellis elements hinged together one after the other by means of horizontal rotation pins and turned into vertical positions, its most inner or first element being hinged at its free end, by means of two horizontal rotation pins one of which is hollow for the passage of the liquid cement, to two vertical plates rigid with the top of a vertical pin which is hollow for the passage of the liquid cement and is used for the rotation of the articulated arm, and is supported rotatable through 360° inside a vertical tube portion welded to the end of a bracket structure fixed to said recoverable service module, which rests on the sea bed by way of feet hinged to the service module by means of ball joints, said vertical articulated positioning arm being provided with an articulated conduit in the form of three successive jointed pipes which follows the configuration of said articulated arm, to which it is fixed, and connects said hose of the support module to said hollow horizontal rotation pins for said first element of the articulated arm, said hollow pin being connected by a conduit to the upper end of said hollow vertical rotation pin for the articulated arm, the lower end of which is connected by flexible conduits to the same number of closure headpieces as the number of cylindrical liquid cement containers supported by the recoverable service module, said closure headpieces being of cone frustum shape, and being clamped in a sealed manner against the ends of the respective cylindrical containers by means of hydropneumatically controlled cams, and all being mounted on a single carriage which slides, under hydropneumatic control, on two rails supported by said recoverable service module, means being also provided for releasably and rotatably supporting said support module at the free end of said third element of the vertical articulated positioning arm, and for rotating said hollow vertical rotation pin for the vertical articulated positioning arm inside said vertical supporting tube portion, and the individual elements of the vertical articulated positioning arm one relative to the other about their respective horizontal rotation pins.

According to a further characteristic of the present invention, said means for releasably and rotatably supporting said support module at the free end of said third element of the vertical articulated positioning arm consist of a substantially U-shaped support frame of C cross-section, into which is inserted a side of said tubular perimetral reinforcement of the support module, which is supported thereat by a hook hinged to the free end of said third element of the vertical articulated positioning arm and rotated by a hydropneumatic cylinder supported to said third element, said support frame being provided, on its centre line, with a pin which is rotatably supported in a cavity in the free end of said third element of the vertical articulated positioning arm, and is rotated by a hydropneumatic cylinder mounted orthogonally on the outside of said third element and connected to a lug on said pin which projects from a slot in said third element. According to a further characteristic of the present invention, said means for rotating said hollow vertical rotation pin for the vertical articulated positioning arm in said vertical tube support portion consist of a pulley fixed to the bottom of said hollow vertical pin, and cooperating with a drive chain the two ends of which are fixed to the pistons of two hydropneumatic cylinders mounted on said recoverable service module and driven synchronously in opposition. In this manner, by synchronously moving the two cylinder pistons in opposite directions, the chain is caused to move on one side or the other, and this impresses a rotation on the pulley and consequently on the hollow vertical pin, which can thus be made to rotate through 360° about its vertical axis, together with the vertical articulated positioning arm connected to it.

According to a further characteristic of the present invention, said means for rotating said third element of the vertical articulated positioning arm relative to the second element of said arm, about its horizontal rotation pin which hinges it to said second element, consist of a hydropneumatic cylinder hinged respectively between said second element and a C-shaped lever, one end of which is hinged to said second element whereas its other end is connected by a connecting rod to said third element of the vertical articulated positioning arm. In this manner it is possible to provide a wide rotation of the third element of the vertical articulated positioning arm supporting the support module, by means of a small displacement of the piston of said hydropneumatic cylinder. According to a further characteristic of the present invention, said means for rotating the second element of said vertical articulated positioning arm relative to the first element of said arm, about its horizontal rotation pin which hinges it to said first element, consist of a hydropneumatic cylinder hinged respectively between the centre line of said first element and a common end of two rods, the other ends of which are hinged respectively to the first and second element of said vertical articulated positioning arm. In this manner, the maximum rotation of the second element of the vertical articulated positioning arm relative to the first element is attained when the said two rods are aligned one with the other, and is then equal to the sum of the lengths of said rods, the value of which is always considerably greater than the value of the displacement of the piston of the hydropneumatic cylinder necessary for aligning said rods. This system also allows a wide rotation of the second element by means of a small displacement of the piston of the hydropneumatic cylinder. Finally, according to a further characteristic of the present invention, said means for rotating said first element of the vertical articulated positioning arm about its horizontal rotation pins which hinge it to said vertical plates consist simply of a hydropneumatic cylinder hinged respectively between said vertical plates and the centre line of said first element. The invention will be more apparent with reference to the accompanying drawings which illustrate a preferred embodiment thereof given by way of non-limiting example in that technical and constructional modifications can be made thereto without leaving the scope of the present invention.

With reference to the figures, the reference numeral 1 indicates overall the recoverable service module of the apparatus, which is lowered by a depot ship, not shown on the figures, on to the sea bed 2 by means of the support cable 3. Said recoverable service module 1 is substantially constituted by a T frame formed from the front beam 4 and longitudinal beam 5, which rests on the sea bed 2 by three feet hinged to the frame by ball joints which thus enable the frame to adapt itself to the inclination of the sea bed on which it is lowered, the two feet 6 being hinged to the ends of said front beam 4 whereas the third foot 7 is hinged to the rear end of said longitudinal beam 5. A framework 8 is welded on to said longitudinal beam 5, and lowerly supports the large cylindrical liquid cement containers 9 (six containers are shown in the figure), each of which is provided internally in known manner with a piston, not shown in the figure, which is driven by the thrusting water fed into the rear of the container to expel the liquid cement under pressure. The top of the framework 8 supports two sealed cylinders 10 which contain the pumps for the water which drives said pistons, the pumps for the operating oil for the various hydropneumatic cylinders of the apparatus, the electric motors for driving said pumps, said oil pumps being connected, by means not shown in the figure, to the hydropneumatic unit 11 supported on the lower rear end of said framework 8, above which are disposed the two sealed cylinders 12 containing the battery unit for supplying said electric motors. The top of the frame 8 is connected to said support cable 3 by a compensator for compensating the oscillations generated by the apparatus during its laying on the sea bed, caused by the inevitable rocking motion of the depot ship supporting the apparatus. Said compensator is constituted substantially by a ring 13, to the top of which is fixed said support cable 3 and to the bottom of which are fixed two further cables 14 and 15 (in FIG. 1 only one of these cables is visible, the other being perfectly coplanar and lying below said cable, as can be seen in FIG. 2) which are guided by a suitable guide block 16 fixed to a support bracket 17 fixed to said framework 8, and pass through 90° about a wheel 18 rotatably supported by said support bracket 17 before being hinged respectively at 19 (see FIG. 2) to the ends of a bracket 29 which is hinged in its central part to the end of the rod 21 of the piston of a suitably preset horizontal hydropneumatic cylinder 22 which is supported on the top of said framework 8. In this manner, said oscillations transmitted by the support cable 3 to the cables 14 and 15 are damped by the compensating action of the preset hydropneumatic cylinder 22.

Figure 1:
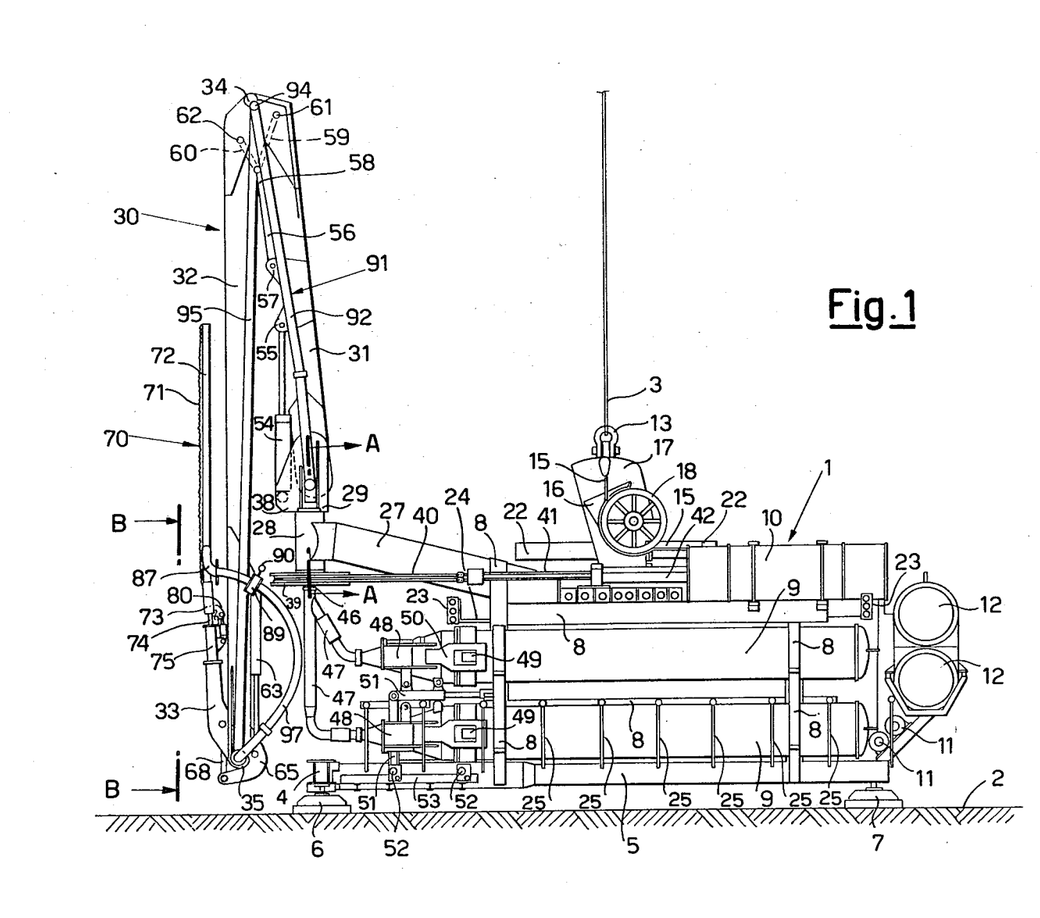
FIG. 1 is a side view of the apparatus according to the invention.
Figure 2:
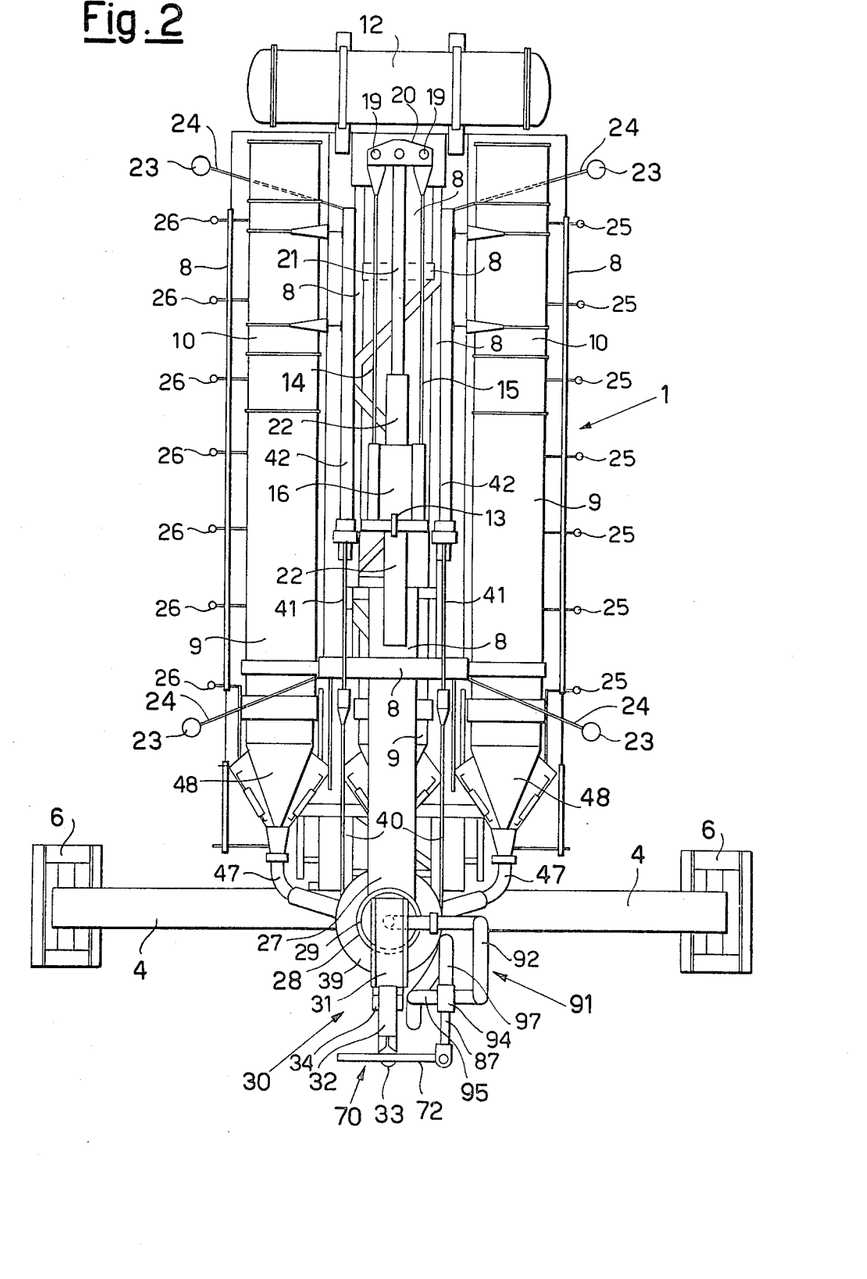
FIG. 2 is a view of the apparatus of FIG. 1 from above.
Figure 3:
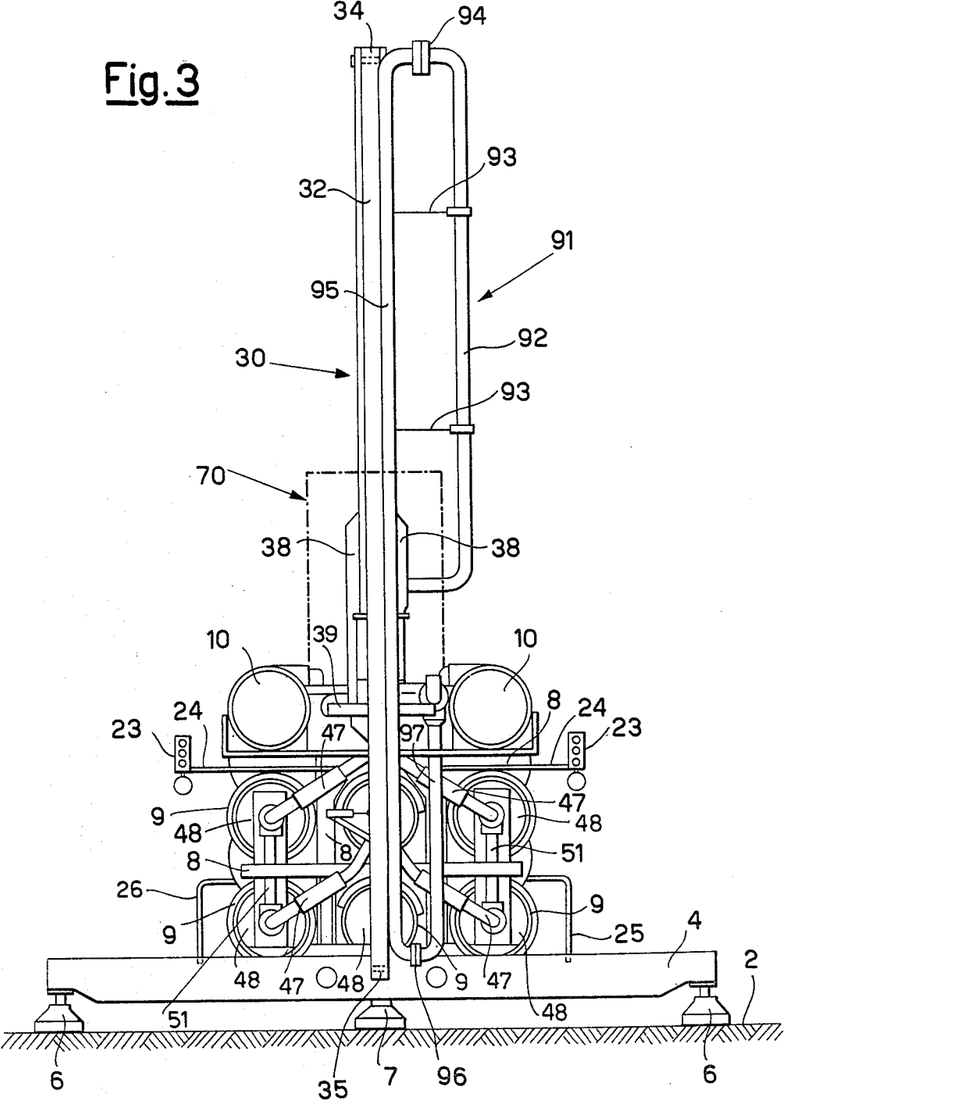
FIG. 3 is a partial front view of the apparatus of FIG. 1, in which the third element of the vertical articulated positioning arm is removed and the support module is shown by a dashed line in order to clearly illustrate the path of the articulated conduit consisting of three successive jointed pipes for conveying the liquid cement into said support module.

FIGS. 1 to 3 also show the position lights and illumination lights 23 which are supported by brackets 24 projecting from the framework 8 at the four corners of the framework 8, and the two sets of levers 25 and 26 for operating said electric drive motors for the water and oil pumps by means of submarine grips, the sets of levers being perfectly identical to each other and being disposed respectively on the bottom of the two sides of the framework 8 to enable a submarine to easily start the various electric motors from either side of the apparatus.

Figure 4:
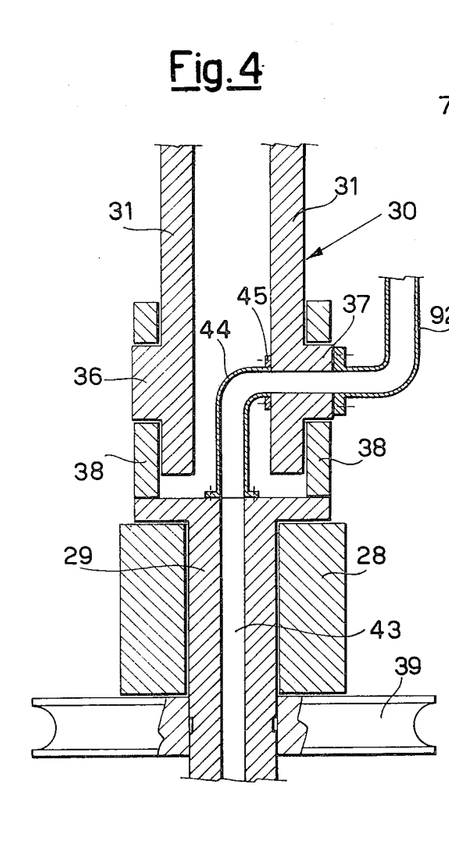
FIG. 4 is a sectional view to an enlarged scale on the line AA of FIG. 1, showing the hinging of the first element of the vertical articulated positioning arm to the vertical hollow rotation pin for said arm.

Finally, to the front top part of the framework 8 there is fixed a bracket structure 27, to the free end of which there is welded a vertical tube portion 28 inside which a hollow vertical pin 29 is supported rotatable through 360° (see specifically FIG. 4) for rotating a vertical articulated positioning arm indicated overall by 30 and constituted substantially by three beam or trellis elements 31, 32 and 33 hinged together one after the other by respective horizontal rotation pins 34 and 35 of which the most inner or first element 31 of said arm 30 is hinged at its free end, by means of the two horizontal rotation pins 36 and 37 (see specifically FIG. 4) of which the pin 37 is hollow, to two vertical plates 38 welded to the top of said hollow vertical pin 29. The hollow vertical pin 29 is rotated through 360° by a pulley 39 fixed to the bottom of said hollow vertical pin 29 and cooperating with a drive chain 40, the two ends of which are fixed respectively to the rods 41 of the pistons of two hydropneumatic cylinders 42 supported by the framework 8 and driven synchronously in opposing directions. In addition, the upper end of the cavity 43 (FIG. 4) of the hollow vertical pin 29 is connected by a conduit 44 with a joint 45 to the horizontal hollow rotation pin 37, and the lower end of the cavity 43 is connected by way of a further joint 46 (FIG. 1) and the flexible conduits 47, of a number equal to the number of cylindrical liquid cement containers 9 (six in the figures), to the closure headpieces 48 for the cylindrical containers 9, which are of cone frustum shape to give improved conveying of the liquid cement from the containers 9 into the respective flexible conduits 47, and are each clamped in a sealed manner against the front end of the cylindrical containers 9 by means of an instant connection and release coupling constituted by two cams 49 (FIG. 1 shows only one cam of the system, the other being opposite) which are oppositely hinged to the respective cylindrical container 9 and are operated by a hydropneumatic drive not shown in the figure, to each act on a hooking element 50 rigid with the closure headpiece 48. Said closure headpieces 48 are all mounted on a single carriage 51 which can be driven by a hydropneumatic drive, not shown in the figure, on its four wheels 52 along two rails 53 supported longitudinally on the two front sides of said longitudinal beam 5 of the frame constituting the recoverable service module 1, so that said headpieces can be easily removed in order to allow easy and careful cleaning and removal of incrustation inside the cylindrical containers 9.

Figure 5:
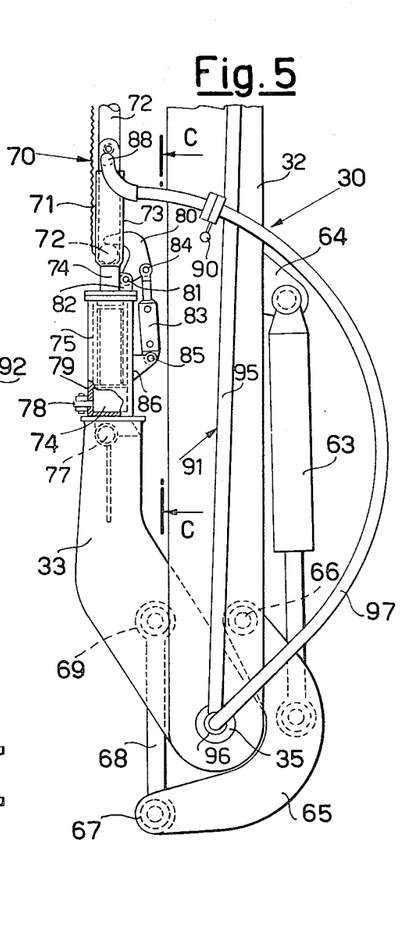
FIG. 5 is a partly sectional enlarged side view of the detail of the apparatus bounded by the line BB of FIG. 1.

Said three elements 31, 32 and 33 of the vertical articulated positioning arm 30 can be rotated one relative to the other about the respective horizontal rotation pins. More specifically, said first element 31 of the arm 30 is rotated about its horizontal rotation pins 36 and 37 by the hydropneumatic cylinder 54 which is hinged respectively between said vertical plates 38 and a bracket 55 fixed to the centre line of said first element 31; the second element 32 of the arm 30 is rotated about its horizontal rotation pin 34 by the hydropneumatic cylinder 56 which is hinged respectively between a bracket 57 fixed to the centre line of the first element 31 of the arm 30, and a common end 58 of two rods 59 and 60, of which the other ends, 61 and 62 respectively, are hinged respectively to the first element 31 and to the second element 32 of the vertical articulated positioning arm 30; the third element 33 of the arm 30 is rotated about its horizontal rotation pin 35 by the hydropneumatic cylinder 63 which is hinged respectively (see specifically FIG. 5) between a bracket 64 fixed to said second element 32 of the arm 30, and a C-shaped lever 65, one end of which is hinged by the pin 66 to said second element 32 of the arm 30, while its other end is hinged by the pin 67 to the end of a connecting rod 68, the other end of which is hinged by the pin 69 to said third element 33.

Figure 6:
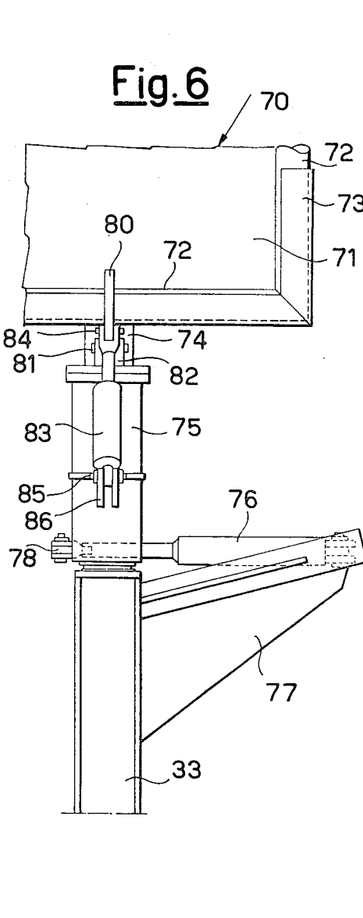
FIG. 6 is a partial view from above of the detail of the apparatus of FIG. 5 on the line CC.

At its free end, said third element 33 of the vertical articulated positioning arm 30 releasably supports a support module indicated overall by 70, which is to be positioned below the suspended pipe to be supported, and to be filled with liquid cement. Said support module 70 is constituted substantially by a high strength synthetic fibre fabric envelope 71 of cushion shape, with a rectangular base piece joined at its edges to another saddle-shaped piece acting as the top, and is strengthened by a tubular perimetral reinforcement 72 which encloses and supports it. One side of said tubular perimetral reinforcement 72 is inserted into a substantially U-shaped support frame 73 of C cross-section, which (see specifically FIGS. 5 and 6, bearing in mind that FIG. 6 shows only about one half of said support frame) is supported rotatable about its axis of symmetry at the free end of said third element 33 of the vertical articulated positioning arm 30 by means of a rotation pin 74 which is fixed on to the centre line of said support frame 73 and is inserted in a hollow cylinder 75 welded to the free end of said third element 33, and is rotated by a hydropneumatic cylinder 76 hinged orthogonally to the outside of said third element 33 between a bracket 77 rigid with said third element 33 and a lug 78 rigid with said rotation pin 74 and projecting from a slot 79 in said hollow cylinder 75. Said tubular perimetral reinforcement 72, and thus the entire support module 70, is retained in said support frame 73 by a hook 80 which, hinged at 81 to a bracket 82 welded to the free end of said hollow cylinder 75, can be rotated by a hydropneumatic cylinder 83 which is hinged at 84 to the hook 80 and at 85 to a bracket 86 rigid with the outside of said hollow cylinder 75. In this manner, the support module 70 can be not only quickly released, but can also be inclined to conform to any inclination on the sea bed on which it is to be rested. Said support module 70 is also provided on one side with a hose 87 fitted with a non-return valve 88 (see specifically FIG. 5) and a connector for connecting to an instant connection and release coupling 89 by means of the projecting control lever 90, which is fitted to the free end of an articulated conduit in the form of three successive jointed pipes, indicated overall by 91, which is supported by said vertical articulated positioning arm 30 and follows its configuration. More specifically, said articulated conduit 91 is constituted by a first pipe 92 which is fixed to said first element 31 of the articulated arm 30 but separated therefrom by means of the tie rods 93 (see specifically FIG. 3) and is connected at one end to said horizontal hollow rotation pin 37 for said first element 31 (see specifically FIG. 4) and at its other end, by means of a joint 94, to the end of a second pipe 95 fixed adhering to the second element 32 of said articulated arm 30, the other end of said second pipe 95 being connected, by means of the joint 96, to one end of a third flexible pipe 97 which at its other free end supports said coupling 89 for connection to the hose 87 of the support module 70. In this manner, the liquid cement contained in the cylindrical containers 9 of the recoverable service module 1 can be conveyed into the support module 70 by passing successively through the flexible conduits 47, the cavity 43 of the hollow vertical pin 29, the conduit 44, the hollow horizontal pin 37 and said articulated conduit 91.

The method of operation of the apparatus is now immediately apparent.

Figure 7:
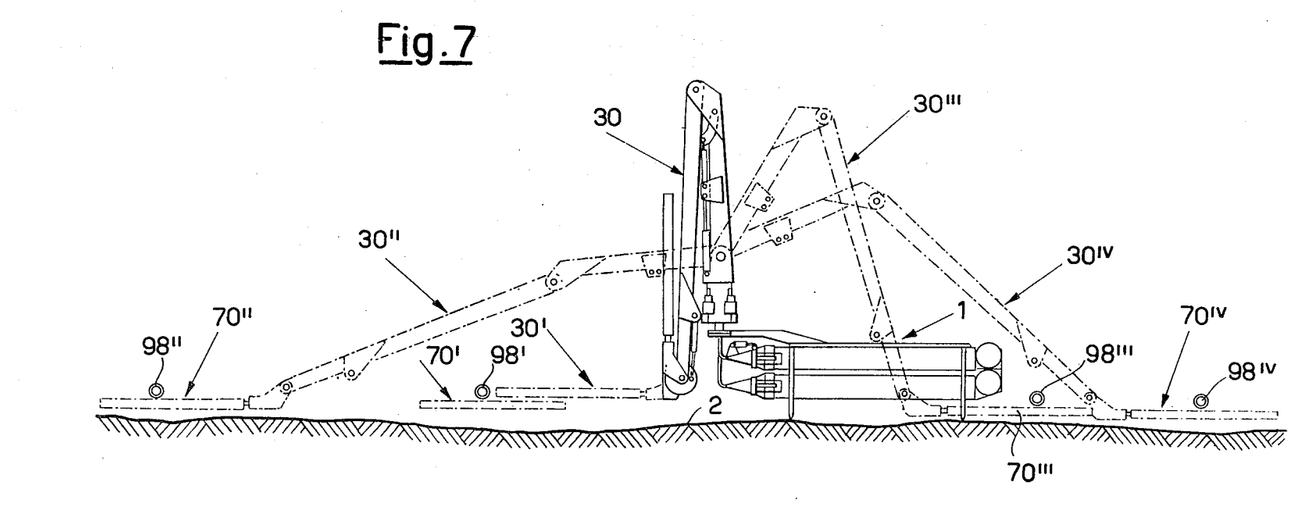
FIG. 7 is a diagrammatic side view showing by means of dashed lines the various configurations which the apparatus according to the invention (shown by a full line) can assume in laying a support module under a pipe suspended over the sea bed and situated at different distances from the apparatus.

When the recoverable service module 1 complete with the support module 70 has been lowered by the depot ship on to the sea bed 2 by means of the support cable 3, the grips of a submarine are made to operate the levers 25 or 26, which operate the electric motors for the oil pumps which control the hydropneumatic cylinders 42, 54, 56 and 63 respectively, by which means the articulated positioning arm 30 is rotated, and its elements are spread apart from each other so that they attain the most suitable configuration for moving and perfectly positioning the support module 70 under the suspended pipe to be supported (FIG. 7 diagrammatically shows four of the possible configurations which the articulated arm 30 can assume, according to the distance from the apparatus of the suspended pipe to be supported 98, and its position relative thereto, said configurations being indicated by the same reference numerals but with different indices). After this, again using the submarine grips, the other lever 25 or 26 is operated to operate the electric motor of the oil pump which controls the hydropneumatic cylinder 76 for inclining the support module 70 to conform to the inclination of the sea bed on which it is to be rested, and then operates the further lever 25 or 26 which operates the electric motors of the water pumps for conveying the liquid cement under pressure into the support module 70. When the support module 70 has been filled with liquid cement, it is released from the free end of the articulated positioning arm 30 by acting with the submarine grip on the release lever 90 of the hose 87 of the support module 70, and on the further lever 25 or 26 which operates the electric motor of the oil pump for controlling the hydropneumatic cylinder 83 in order to rotate the hook 80. Finally, after returning the articulated positioning arm 30 to its initial vertical closed position by acting on said first levers 25 or 26 with the submarine grips, the recoverable service module 1 is recovered on to the depot ship by means of the support cable 3.

We claim:

1. Improved recoverable apparatus for the erecting or forming of liquid cement receiving pipe support means for supporting an undersea pipeline up to a great depth comprising frame means including means for connecting same in a vertically suspended state from a vessel, liquid cement-containing container means mounted on said frame means, hydropneumatic cylinder means mounted on said frame means in operative relationship with said cement-containing container means for actuating discharging the liquid cement therefrom, means mounted on said frame means for actuating said hydropneumatic cylinder means, vertical articulated positioning arm means operatively connected at one end to said frame means, said arm means including three arm elements hingedly connected one after another to each other by horizontally disposed pin means for rotation relative to one another about their respective horizontally disposed pin means, connecting means positioned at the end of the outermost or third arm element for releasably engaging said pipe supporting means, means for actuating each of said arm elements for movement into a plurality of positions, and means operatively associated with said vertical articulated positioning arm means and said cement-containing container means for passage of liquid cement from the cement-containing cement means to the pipe support means releasably connected to the outermost end of the vertical articulated positioning arm means.

2. Apparatus in accordance with claim 1 wherein said connecting means positioned at the end of the outermost arm element for releasably engaging the pipe supporting means comprises substantially U-shaped support frame means having means for receiving a side of said pipe support means therein; hook means connected to said pipe support means and hingedly secured to the free end of the third arm element of said positioning arm means, hydropneumatic cylinder means supported by said third arm element for rotating said hook means, said U-shaped frame support means further including pin means centrally positioned thereon and rotatably supported in a cavity formed in the free end of the third arm element of the positioning arm means, and hydropneumatic cylinder means mounted on said third arm element operationally connected to said pin means for rotation of same.

3. Apparatus in accordance with claim 1 wherein articulated conduit means are operatively associated with said vertical articulated positioning arm means, said conduit means including three successing jointed pipe means following the configuration respectively of the three arm elements of the positioning arm means and constitutes means for passage of the liquid cement to the pipe support means.

4. Apparatus in accordance with claim 3 which includes vertical tube support means secured to the forward end of the frame means, hollow vertical pin means mounted in rotatable relationship through 360° inside said tube means and the lowermost end of said vertical articulated positioning arm means being operatively connected in rotatable relationship with said vertical pin means.

5. Apparatus in accordance with claim 4 wherein means are provided for rotating the hollow vertical pin means in the vertical tube support means, said means comprising pulley means mounted to the bottom of the vertical hollow pin means, and a drive chain operatively associated with said pulley means and the hydropneumatic cylinder means mounted on the frame means.

6. Apparatus in accordance with claim 1 wherein the lowermost arm element of the vertical articulated positioning arm means is hingedly secured to vertical plate means by means of horizontal rotation pins and includes means for rotating the lowermost arm element, said means include hydropneumatic cylinder means hingedly mounted between the vertical plate means and the lowermost arm element.

7. Apparatus in accordance with claim 1 wherein means are provided for rotating the second arm element relative to the first arm element about its horizontal pin means, said means comprising hydropneumatic cylinder means hinged respectively between the center point of the first arm element and the second arm element.

8. Apparatus in accordance with claim 1 wherein means are provided for rotating the third arm element relative to the second arm element, said means comprising hydropneumatic cylinder means hinged respectively between the second arm element and lever means, one end of which is hinged to the second arm element and the other end connected to the third arm element.

* * * * *